B. GOMEZ.
SPRINKLING DEVICE.
APPLICATION FILED APR. 26, 1920.

1,373,324.

Patented Mar. 29, 1921.

Blas Gomez
INVENTOR

BY Victor J. Evans
ATTORNEY

WITNESS:

UNITED STATES PATENT OFFICE.

BLAS GOMEZ, OF EL PASO, TEXAS.

SPRINKLING DEVICE.

1,373,324. Specification of Letters Patent. Patented Mar. 29, 1921.

Application filed April 26, 1920. Serial No. 376,732.

*To all whom it may concern:*

Be it known that I, BLAS GOMEZ, a citizen of Mexico, residing at El Paso, in the county of El Paso and State of Texas, have invented new and useful Improvements in Sprinkling Devices, of which the following is a specification.

This invention relates to lawn sprinklers, and comprehends the use of a plurality of pipes coupled together and arranged in a manner to provide a self-supporting structure, including a discharge nozzle that can be turned to different positions for the purpose of spraying water in different directions.

The nature and advantages of the invention will be better understood when the following detail description is taken in connection with the accompanying drawings, the invention residing in the construction, combination and arrangement of parts as claimed.

In the drawings forming part of this application, like numerals of reference indicate similar parts in the several views and wherein:—

Figure 1:
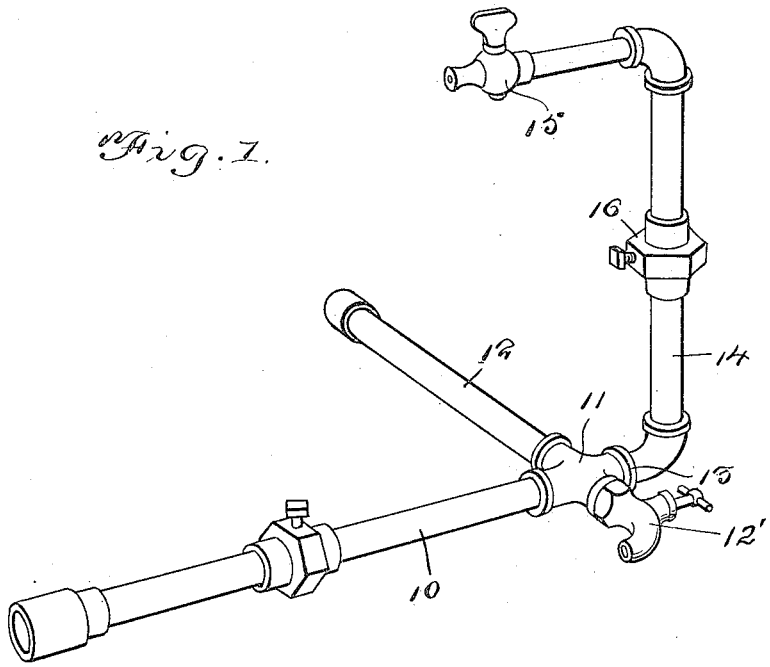
Figure 1 is a perspective view.
Figure 2:
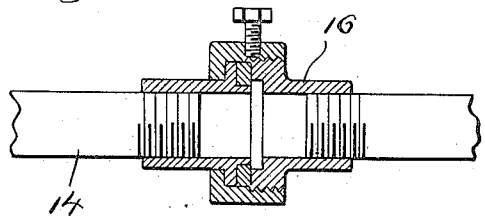
Fig. 2 is a sectional view taken through one of the coupling members.

Referring to the drawings in detail 10 indicates a water supply pipe leading from any suitable source and equipped at one end with a four-way coupling 11. Projecting from one side of the pipe 10 and associated with the adjacent terminal of the coupling 11 is a branch pipe 12, while projecting from the opposite side of said pipe and connected with the adjacent terminal of the coupling is a drain cock 12'. Associated with the remaining terminal 13 of the coupling 11 is a pipe 14 arranged at right angles with regard to the pipe 10 and equipped at its upper end with a discharge nozzle 15. The nozzle 15 is mounted as at 16 for rotation upon the pipe 14, so that the water from the nozzle may be delivered in any number of different directions. The nozzle is equipped with a valve plug as shown. While the invention is susceptible for use in a large number of capacities, it is primarily designed for use as a lawn sprinkler, and the particular disposition of the branch pipe 12 and drain cock 12' with respect to the water supply pipe 10, provides for a self-supporting structure which can be set upon the lawn with the pipe 14 vertically disposed.

While it is believed that from the foregoing description the nature and advantages of the invention will be readily apparent, I desire to have it understood that I do not limit myself to the details herein shown and that such changes may be resorted to when desired as fall within the scope of what is claimed.

What I claim is:—

A water sprinkler comprising in combination a four-way base union, a supply pipe coupled to one branch of the union, a second pipe arranged at right-angles to the supply pipe and connected with another branch of the union, a drain cock coupled to a third branch of said union directly opposite the second mentioned pipe and coöperating therewith, the supply pipe and said union to provide a supporting base for the sprinkler, an elbow connected with the final branch of the union and curved upwardly, and an additional pipe connected with said elbow and vertically disposed, and a discharge nozzle associated with the latter mentioned pipe and arranged in parallelism with and above said base structure, and means for associating the nozzle with said latter mentioned pipe in a manner whereby said nozzle may be turned to different positions for the purpose specified.

In testimony whereof I affix my signature.

BLAS GOMEZ.